UNITED STATES PATENT OFFICE.

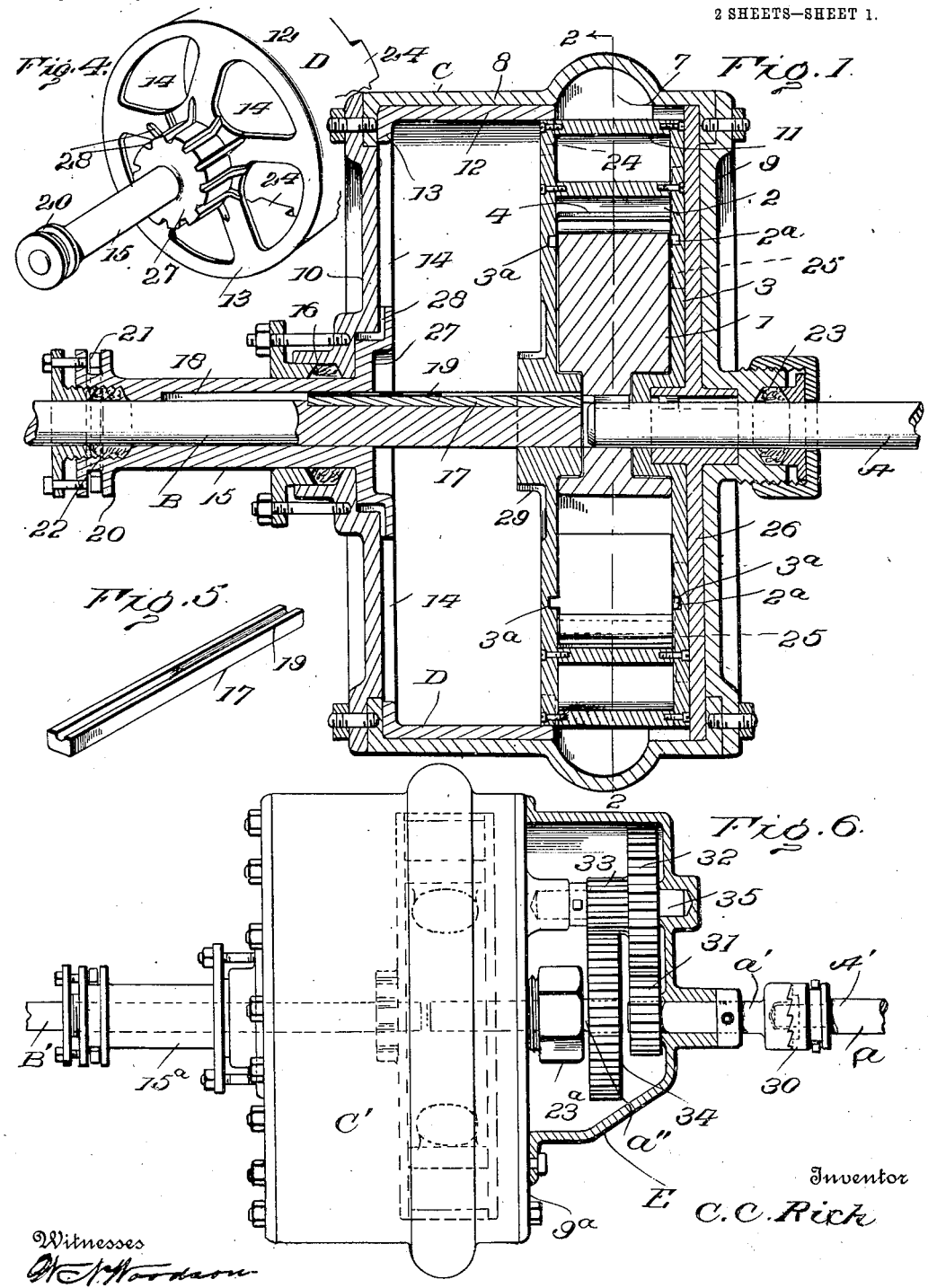
C. C. RICH.
CLUTCH.
APPLICATION FILED MAR. 29, 1911.
1,017,802. Patented Feb. 20, 1912.

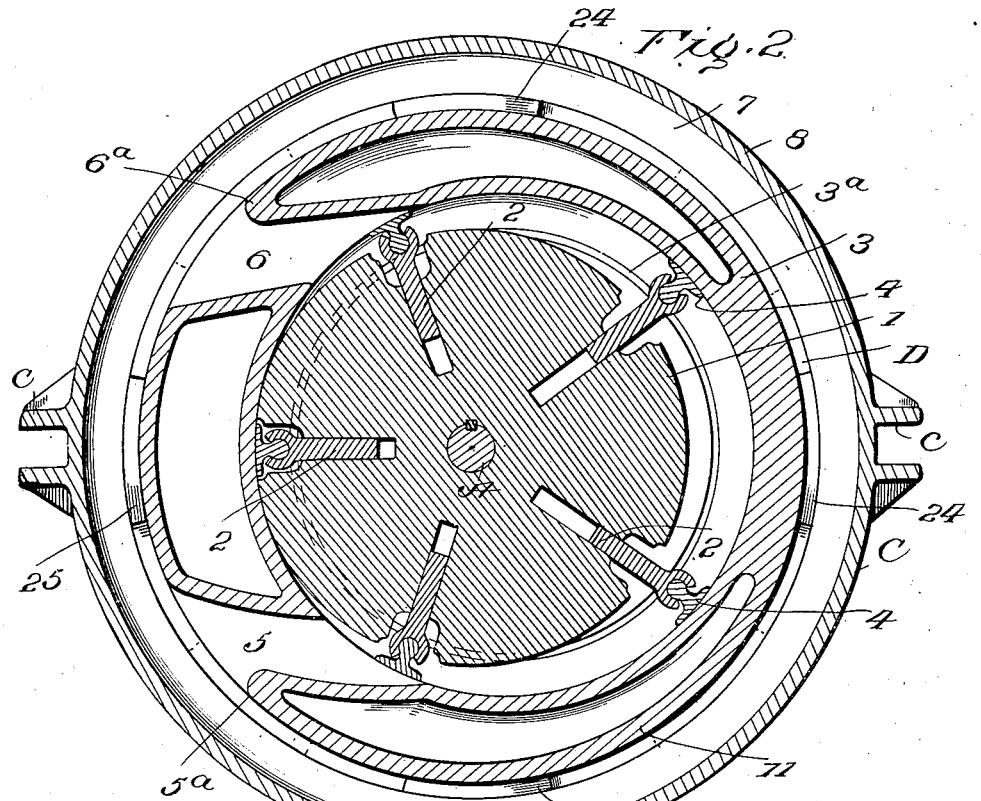
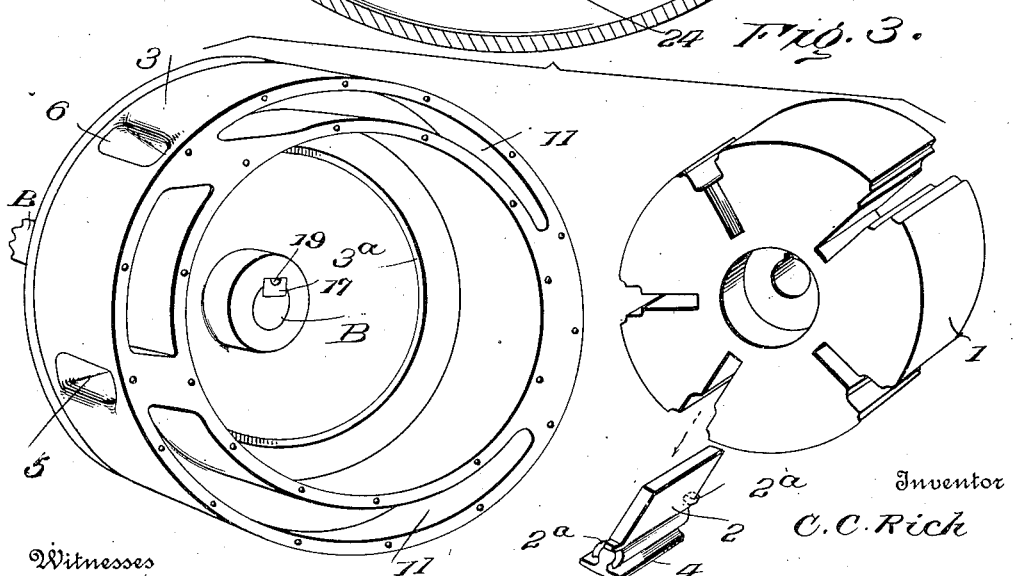

CHARLES CLAYTON RICH, OF MOUNT VERNON, NEW YORK, ASSIGNOR TO THE HYDROKINETIC TRANSMISSION CO., OF MOUNT VERNON, NEW YORK, A CORPORATION OF MAINE.

CLUTCH.

1,017,802.  Specification of Letters Patent.  Patented Feb. 20, 1912.

Application filed March 29, 1911. Serial No. 617,777.

*To all whom it may concern:*

Be it known that I, CHARLES CLAYTON RICH, citizen of the United States, residing at Mount Vernon, in the county of Westchester and State of New York, have invented certain new and useful Improvements in Clutches, of which the following is a specification.

This invention comprehends certain new and useful improvements in clutches of the fluid type, and relates particularly to that character of clutch for which I obtained Letters Patent of the United States, Number 988,817, dated April 4, 1911. The patented clutch just referred to embodies a rotor, a rotor casing provided with inlet and outlet ports, and a shiftable shell casing surrounding the rotor casing and inclosing the latter and the rotor and adapted to control the communication between the inlet and outlet ports, whereby power may be transmitted direct from a drive shaft to a driven shaft to rotate the latter within a wide range of gradations in speed, from the slowest up to the highest of which the engine rotating the drive shaft is capable. In the patented construction, which to a considerable degree embodies the same principles as are embodied in the device of the present case, the casing or shell surrounding the rotor casing is in itself rotatable, as well as longitudinally movable, the line of shafting being considered, and the primary object of the present invention is a construction and arrangement of parts whereby the outside housing or case, corresponding to the shiftable shell casing of the patented device in so far as the inclosing of the other parts is concerned, may, if desired be held relatively stationary, with the result, among other things, that space is economized and a more simple, durable and efficient construction secured.

It is to be understood that the same results are attained by tne construction of the present invention as are obtained by the patented device, the present embodiment of the broad principles of the invention securing, however, additional features of advantage which will be hereinafter pointed out and at once rendered apparent to those skilled in the art to which this invention appertains.

The invention also has for one of its objects a clutch of the fluid type embodying improved means whereby at one limit of the operative movement of the clutch, the drive and driven shafts will be mechanically connected together, the rotor and rotor casing both being entirely relieved of the stress of transmission of power.

Furthermore, like the patented construction, the present invention has for its object an improved clutch of this character which will be sensitive in its action and capable of being very easily manipulated, there being practically no pressure whatever, at any time in the operation of the clutch, within the outer case or casing of the device, this admitting of the use of stuffing boxes of light construction and easy pressure against the packing, whereby the frictional resistance to the movement of the valve or gate which controls the ports of the rotor casing is reduced to a minimum.

The invention also has for its object a device of this character in which ample means are provided for the displacement of the fluid employed, so that practically no cushioning thereof is produced, thereby saving wear on the parts and securing the maximum efficiency of the clutch.

A further object of the invention is a clutch of the fluid type in which the shiftable valve or gate at all times constitutes a bearing for the rotor casing, thereby assisting in retaining the drive and driven shafts in proper alinement; and as a feature subsidiary or ancillary to the one just hereinbefore described, the invention also has for its object a construction and arrangement of parts whereby the element which is employed to co-act with the longitudinally shiftable valve or gate to mechanically lock or connect the drive and driven shafts is so arranged that it, also, when desirable, may serve as a bearing for the rotatable rotor casing, securing by this means the same advantages as are produced by the proportion and arrangement of parts of the valve and rotor casing. And the invention also aims to generally improve this class of devices and to render them more useful and commercially desirable in connection with automobiles or other motor vehicles, marine vessels, and other mechanism generally, particularly that which is designed to be driven by motors or engines of the internal combustion type.

With these and other objects in view as will more fully appear as the description proceeds, the invention consists in certain constructions, arrangements and combinations of the parts that I shall hereinafter fully describe and claim.

For a full understanding of the invention reference is had to the following description and accompanying drawings, in which:—

Figure 1 is a transverse sectional view of my improved clutch; Fig. 2 is a transverse section on the line 2—2 of Fig. 1; Fig. 3 is a perspective view of the rotor casing, the rotor, and one of its blades, these parts being shown detached from each other and in juxtaposition; Fig. 4 is a detail perspective view of the port controlling valve or gate employed; Fig. 5 is a similar view of a key which may be used; and Fig. 6 is an elevation illustrating an embodiment of the device in which reducing gears are employed, the casing for said gears being shown in section.

Corresponding and like parts are referred to in the following description and indicated in all the views of the accompanying drawings by the same reference characters.

Referring to the drawings, A designates a drive shaft, and B a driven shaft, although it is to be understood that this selection is merely arbitrary and that either shaft may be the drive and the other the driven shaft.

A rotor 1 is concentrically mounted upon the drive shaft A and includes any desired number of blades 2 working within the chamber formed by the rotor casing 3, said rotor casing being eccentrically disposed and keyed or otherwise secured to the driven shaft B. In the present instance, the blades 2 are formed at their side edges with lugs 2ª working in circular channels 3ª formed in the heads of the rotor casing 3, it being of course understood that said casing may be formed with either one or both of its heads as a separate element secured to the body portion thereof in any desired way. Each of the blades 2 carries at its outer end a shoe 4 which is curved so as to conform to the wall of the chamber in the casing 3 with which the shoes contact, the connection between the shoes and their blades being such as to permit a slight rocking movement of the shoes so as to at all times secure and maintain proper engagement.

The rotor casing 3 is formed with an inlet passage or port 5 and an outlet passage or port 6, spaced from each other a predetermined distance, as best illustrated in Fig. 2, said inlet and outlet passages opening from and into, respectively, an annular raceway 7 which is formed intermediate of the opposite side edges of the body portion 8 of an outer housing or case C. Manifestly, this case or housing may be formed of any desired number of parts or sections, transversely considered. It is shown as provided with heads 9 and 10 secured to the body portion by stud bolts. In order that the rotor casing 3 may have a concentric bearing in the relatively stationary housing or case C, the rotor casing is formed with circumferentially extending webs 11 providing air spaces, as best illustrated in Fig. 2, the inlet and outlet ports or passages 5 and 6 extending through the web 11, as best illustrated in Fig. 3. At this point it will be understood, referring particularly to Figs. 1 and 2, that when the ports or passages 5 and 6 have unobstructed communication with the annular raceway 7, the oil or similar fluid medium will have free circulation around the raceway 7, and consequently, the rotation of the shaft A and the rotor 1 will impart no movement whatever to the rotor casing and consequently no movement to the driven shaft B.

In order to regulate, or if desired to absolutely shut off the communication between the ports or passages 5, 6, and the raceway 7 so as to transmit power to the driven shaft to rotate the latter within a wide range of gradation in speed, from the slowest up to the highest of which the engine rotating the drive shaft is capable, the present invention provides a longitudinally shiftable valve or gate D, the same, in the present instance, embodying a cylindrical drum 12 which snugly fits within the housing or case C and which is designed to be moved longitudinally to partially or wholly cover and uncover the communication between the ports or passages 5 and 6 and the raceway 7, before mentioned. In addition to the cylindrical body portion or drum 12 of the valve, said valve includes a web or head 13 disposed perpendicularly to the shaft (said web being formed with any desired number of openings 14 so as to permit of free liquid displacement and a consequent free movement of the valve), and a sleeve 15 which is mounted for a longitudinal sliding movement on the driven shaft B, said sleeve passing through a stuffing box 16 with which the housing or case C is provided, and being compelled to turn or rotate with the driven shaft B, owing to the fact that there is a spline and groove connection between the sleeve and said shaft. In the present embodiment of the device, the key 17 that is secured to the driven shaft B and that also serves to connect to said shaft the rotor casing 3, is longitudinally grooved, as indicated in Fig. 1 and illustrated more in detail in Fig. 5, whereby any cushioning of the fluid medium in the groove 18 of the sleeve 15 is prevented. The groove in the key is designated 19. The sleeve 15 is formed at its outer end with an annular grooved collar 20 designed for the reception of a yoke 21 of a shipper lever (not shown), and the sleeve works on a stuffing box 22 so as to secure a fluid tight joint around the shaft B. 23 designates a stuffing box through which the shaft A extends.

It will be remembered that the statement of the objects of the present invention included means whereby the drive and driven parts may be mechanically locked or connected together so as to relieve the fluid operated parts of strain and wear. To secure this result, the present invention includes any desired number, shape, and disposition of lugs, protuberances, or depressions 24 formed on the valve 12, and a corresponding number, shape, and disposition of lugs, protuberances, or depressions 25 on a plate 26 which is keyed or otherwise rigidly connected to the drive shaft A. By this means it is to be understood that when the valve D is moved in a direction to entirely shut off the communication between the ports or passages 5 and 6 and the annular raceway 7 of the case C (that is, to the right in Fig. 1), the complementary lugs, protuberance, or depressions will interlock between the valve D and plate 26, thereby producing a mechanical connection, instead of a fluid operated connection, between the driving shaft A and the driven shaft B on which respectively the plate 26 and valve D are keyed. By this means, it will be noted that at one limit of the operative movement of the clutch, the drive and driven shafts will be mechanically connected, the rotor and rotor casing being both entirely relieved of the stress of transmission of power, the power being transmitted from the drive shaft to the driven shaft, by and through the medium of the plate 26 which is secured to the drive shaft and the ports closing valve or gate which is splined to the driven shaft, the mechanical connection between the drive and driven shaft being completed through the interengagement of the complemental lugs 25 or their equivalent, formed on the plate and valve respectively, as before set forth.

The hub 27 of the valve D is formed on its outermost face with any desired number and disposition of grooves 28 extending parallel to the shafting, the grooves also extending radially and in an outward direction as shown, whereby even when the valve is at the limit of its movement in one direction, i. e., in its full inoperative position, there will be no possibility of forming a fluid pressure cushion between said hub and the corresponding or adjacent portion of the head 10 of the housing of case C. For a similar reason, that is, to avoid any fluid cushioning when the valve D is at the other limit of its movement, the adjoining hub of the rotor casing 3 is correspondingly formed with angular grooves 29.

From the foregoing description in connection with the accompanying drawings, the operation of my improved clutch will be apparent.

In describing the practical use of the device it will be understood that when the parts are in the relative positions illustrated in Fig. 1, the ports or passages 5 and 6 will be entirely open to the annular raceway 7 of the housing or case C, whereby a free circulation of the oil or other fluid medium will be permitted and the rotation of the shaft A and the consequent rotation of the rotor 1 will have no effect whatever upon the rotor casing 3 and will therefore impart no movement to the driven shaft B. By moving the valve D to the right (in Fig. 1) the communication between the raceway 7 and the inlet and outlet ports or passages may be gradually cut off, so as to secure any gradation in speed, and, when the valve D has been moved far enough to completely cut off the communication between the raceway and the outlet and inlet ports or passages, it will of course be understood that the circulation of the fluid will be entirely prevented and the driven shaft will have power transmitted to it direct from and commensurate with the power and rotation of the drive shaft A. When the parts are in this position, however, the fluid pressure is not depended upon at all, but, instead, the valve D and plate 26 that is keyed to the drive shaft A are rigidly and mechanically connected together, thereby relieving the fluid operated parts of strain and wear.

It is of course to be understood that the outer housing or casing C if desirable is held relatively stationary, although it may be permitted to move slightly so as to compensate for any vibration of the mechanism such as will be produced when the clutch is embodied in an automobile or other motor driven vehicle, and for this purpose the case or housing C may be provided with spaced lugs c to receive supporting rods or similar sustaining devices. Preferably, the inlet and outlet ports or passages 5 and 6 are beveled or rounded at one end, as indicated at 5ᵃ and 6ᵃ respectively, whereby they will present the most efficient openings to the fluid medium and produce the least possible dragging or frictional effect thereon. In other words, this particular design is employed to facilitate the ingress and egress of the fluid with as little frictional resistance as possible, which is of importance when the ports are uncovered and the shafts free for independent movement.

It is to be understood of course that the invention is not limited to any particular disposition, size or form of the inlet and outlet ports or passages, neither is the invention limited to any particular construction of pump or rotor and casing thereof. While the raceway 7 is shown as substantially semi-circular in cross section in the present embodiment of the device, this also is not essential, as it is manifest that the raceway may be of any desired shape or formation. It is of course also to be understood that holes and plugs therefor may be formed anywhere in the case or housing C to admit of the introduction or withdrawal of the oil or other fluid medium.

Reference is now to be had to Fig. 6, in which is illustrated another embodiment of my invention. This view is used to show that, if desired, I may employ reducing gears and a mechanically controlled clutch, in connection with the other parts of the invention. In Fig. 6, C' designates the housing or case corresponding to the part C hereinbefore described, 15ª designates the sleeve thereof, B' designates the driven shaft and A' designates the drive shaft, the latter being composed of a plurality of sections, three in number in the present instance, designated a, a' and a''. The sections a and a' may be connected and disconnected by means of a mechanical clutch 30, for use whenever deemed advisable, and in this connection it is to be particularly noted that the clutch 30 may be operated to connect the sections a and a' with the engine shaft running at its highest speed, but with the valve D in its inoperative position, as there is comparatively no strain upon the shaft B as the fluid medium may circulate freely through the passages 5 and 6 and around the annular raceway 7. The section a' is connected to the section a'' by means of reducing gears 31, 32, 33 and 34, the gears 32 and 33 being mounted upon a stub shaft 35 and the whole being housed with a casing E which is in the present instance shown as bolted to the adjoining head 9ª of the housing C', but which may be, if desired, an integral part thereof.

It is of course understood that the use of the term "inlet port or passage" as applied to the part designated 5 and the term "outlet port or passage" as applied to the opening 6, are merely arbitrarily used and interchangeable, as the rotor is of course reversible and one of these two ports or passages is the inlet passage and the other the outlet port or passage according to the direction in which the drive shaft A is rotating.

While the foregoing description and accompanying drawings set forth the preferred embodiment of my invention, it is to be understood that various changes may be made in the details of construction and arrangement and proportions of the parts without departing from the scope of the invention as defined by the appended claims.

Having thus described my invention, what is claimed as new is:

1. A clutch of the character described, comprising a rotor, a rotor casing provided with inlet and outlet ports, a valve surrounding the rotor casing and longitudinally movable thereover to open and close the inlet and outlet ports, and a housing surrounding the valve and rotor casing and provided with a raceway adapted to communicate with said ports.

2. A clutch of the character described, comprising a rotor, a shaft to which the rotor is connected, a rotor casing in which the rotor is mounted, said casing being formed with inlet and outlet ports, a shaft to which said rotor casing is connected, a valve having a longitudinally sliding movement on the last named shaft and adapted to surround the rotor casing to control the communication between the ports thereof, and a housing surrounding the valve and rotor casing and provided with a raceway adapted to communicate with the ports of the rotor casing.

3. A clutch of the character described, comprising a rotor, a shaft to which the rotor is connected, a rotor casing in which the rotor is mounted, said casing being formed with inlet and outlet ports, a shaft to which said rotor casing is connected, a valve having a longitudinally sliding movement on the last named shaft and adapted to surround the rotor casing to control the communication between the ports thereof, and a relatively stationary housing surrounding the valve and rotor casing and provided with a raceway adapted to communicate with the ports of the rotor casing.

4. A clutch of the character described, comprising, in combination with drive and driven shafts, a rotor connected to the drive shaft, a rotor casing connected to the driven shaft and formed with inlet and outlet ports, a valve longitudinally movable upon the driven shaft but compelled to rotate therewith and adapted to surround the rotor casing to cover and uncover the ports thereof, a housing surrounding said valve and rotor casing, and means for mechanically connecting said valve and the drive shaft upon the movement of said valve in one direction with the inlet and outlet ports of the rotor casing covered.

5. A clutch of the character described, comprising a drive shaft, a driven shaft, a rotor connected to the drive shaft, a rotor casing surrounding the rotor and provided with inlet and outlet ports and connected to the driven shaft, a valve movable longitudinally on the driven shaft, but rotatable therewith, the valve embodying a cylindrical drum adapted to slip over upon the rotor casing and control the inlet and outlet ports thereof, a housing surrounding the valve and rotor casing and in which the valve has a rotatable bearing, said housing being formed with a raceway adapted to communicate with the inlet and outlet ports of the rotor casing, a plate secured to the drive shaft, and means on the valve and plate adapted to co-act for interlocking engagement upon the movement of the valve to the position in which the communication between the inlet and outlet ports of the rotor casing are shut off from the raceway of the casing.

6. A clutch of the character described, comprising a drive shaft, a driven shaft, a rotor connected to the drive shaft, a rotor casing connected to the driven shaft and formed with inlet and outlet ports, a valve movable longitudinally on the driven shaft and rotatable therewith and adapted to slip over the rotor casing to control, that is, cover and uncover the inlet and outlet ports thereof, a housing surrounding the valve and rotor casing and provided with a raceway in the path of movement of the inlet and outlet ports of the rotor casing, the valve including a sleeve movable upon the driven shaft and protruding out from the housing, and means connected to said sleeve for moving the valve.

7. A clutch of the character described, comprising a drive shaft, a driven shaft, a rotor connected to the drive shaft, a rotor casing connected to the driven shaft, the rotor casing being provided with inlet and outlet ports, a valve consisting of a cylindrical drum adapted to slip over the rotor casing to cover and uncover the ports thereof and a web formed with openings, a housing surrounding the drum of the valve and the rotor casing and formed with a raceway in the path of movement of the inlet and outlet ports of the rotor casing, and means for moving the valve.

8. A clutch of the character described, comprising a drive shaft, a driven shaft, a rotor connected to the drive shaft, a rotor casing connected to the driven shaft, the rotor casing being provided with inlet and outlet ports, a valve embodying a cylindrical drum adapted to slip over the rotor casing to cover and uncover the ports thereof, a housing surrounding the drum of the valve and the rotor casing and formed with a raceway in the path of movement of the inlet and outlet ports of the rotor casing, the valve being also provided with a hub and the hub being formed with displacement grooves, for the purpose specified.

9. A clutch of the character described, comprising a drive shaft, a driven shaft, a rotor connected to the drive shaft, a rotor casing connected to the driven shaft and formed with inlet and outlet ports, a valve movable on the driven shaft and rotatable therewith and adapted to slip over the rotor casing to control the ports thereof, a housing surrounding the valve and rotor casing, the housing being formed with a raceway in the path of movement of the inlet and outlet ports of the rotor casing and the rotor casing being formed with a hub, the valve also being formed with a hub adapted to fit over the hub of the rotor casing and the hub of the rotor casing being formed with fluid displacement grooves, for the purpose specified.

10. A clutch of the character described, comprising a rotor, a rotor casing provided with inlet and outlet ports, a shiftable valve surrounding the rotor casing and adapted to control the communication between said inlet and outlet ports, a shaft to which the rotor is connected, another shaft to which the rotor casing is connected, a housing surrounding the rotor casing and valve and formed with a race-way adapted to communicate with said inlet and outlet openings, and means for mechanically connecting together the two shafts at one limit of the operative movement of the valve.

11. In a clutch of the character described, a pump including a casing provided with inlet and outlet ports, a movable valve controlling the communication between said inlet and outlet ports, and a housing inclosing the casing and movable valve and provided with a race-way to communicate with said ports when the valve is in one position and arranged to be partly or wholly closed to communicate with said ports in other positions of the valve, the pump also including liquid forcing elements mounted in the casing, a shaft to which said casing is secured, and another shaft with which the liquid forcing elements are connected.

12. In a clutch of the character described, a pump including a casing provided with inlet and outlet ports, a housing inclosing the casing and provided with a race-way, a valve movable in said housing and over said casing and arranged to close and open the communication between said ports and the race-way, the pump also including liquid forcing elements mounted in the casing, a shaft to which said casing is secured, and another shaft with which the liquid forcing elements are connected.

In testimony whereof, I affix my signature in presence of two witnesses.

CHARLES CLAYTON RICH. [L. S.]

Witnesses:
W. N. WOODSON,
FREDERICK S. STITT.